(12) United States Patent
Koith et al.

(10) Patent No.: US 9,551,359 B2
(45) Date of Patent: Jan. 24, 2017

(54) DEVICE FOR PRESSURE-DEPENDENT OPENING OF A SUCTION INTAKE

(75) Inventors: Jorg Koith, Neunkirchen-Seelscheid (DE); Lothar Maigre, Sankt Augustin (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 178 days.

(21) Appl. No.: 14/129,605

(22) PCT Filed: Jun. 15, 2012

(86) PCT No.: PCT/EP2012/002526
§ 371 (c)(1),
(2), (4) Date: Dec. 27, 2013

(87) PCT Pub. No.: WO2013/000542
PCT Pub. Date: Jan. 3, 2013

(65) Prior Publication Data
US 2014/0134007 A1    May 15, 2014

(30) Foreign Application Priority Data
Jun. 27, 2011   (DE) .................. 10 2011 105 891

(51) Int. Cl.
*F04F 5/52*    (2006.01)
*F04F 5/46*    (2006.01)
*B60K 15/035*    (2006.01)

(52) U.S. Cl.
CPC .............. *F04F 5/52* (2013.01); *B60K 15/035* (2013.01); *F04F 5/461* (2013.01)

(58) Field of Classification Search
CPC ................ F04F 5/461; F04F 5/48; F04F 5/52; B60K 15/035

(Continued)

(56) References Cited

U.S. PATENT DOCUMENTS 1,133,601 A * 3/1915 Wood ............... F04F 5/461
                                              137/466
6,098,662 A * 8/2000 Gregoire ............ G05D 16/18
                                              137/891

(Continued)

FOREIGN PATENT DOCUMENTS

DE    4201037 A1    7/1993
EP    1470944 A1    10/2004

(Continued)

OTHER PUBLICATIONS

PCT International Search Report and Written Opinion mailed Sep. 26, 2012, received in corresponding PCT Application No. PCT/EP12/02526, 9 pgs.

*Primary Examiner* — Charles Freay
*Assistant Examiner* — Philip Stimpert
(74) *Attorney, Agent, or Firm* — Grossman Tucker Perreault & Pfleger, PLLC

(57) ABSTRACT

The invention relates to a device (6) for pressure-dependent opening of a suction intake (10), comprising a suction jet pump (11), comprising a feed line (12), an outlet line (13) and the suction intake (10); a valve body (15), displaceably arranged inside the feed line (12) in the delivery direction (14) of the suction jet pump (11) and having an effective area (16) exposed to the feed pressure of the suction jet pump (11); and a spring element (17), arranged between the feed line (12) and the valve body (15), for applying a force in opposition to the feed pressure inside the feed line (12); wherein the effective area (16) of the valve body (15), and the spring element (17) are designed so that the valve body (15) closes the suction intake (10) so that it is fluid-tight below a predefined pressure inside the feed line (12) and opens said intake when the predefined pressure inside the feed line (12) is exceeded. The invention further relates to a (Continued)

Figure 1:
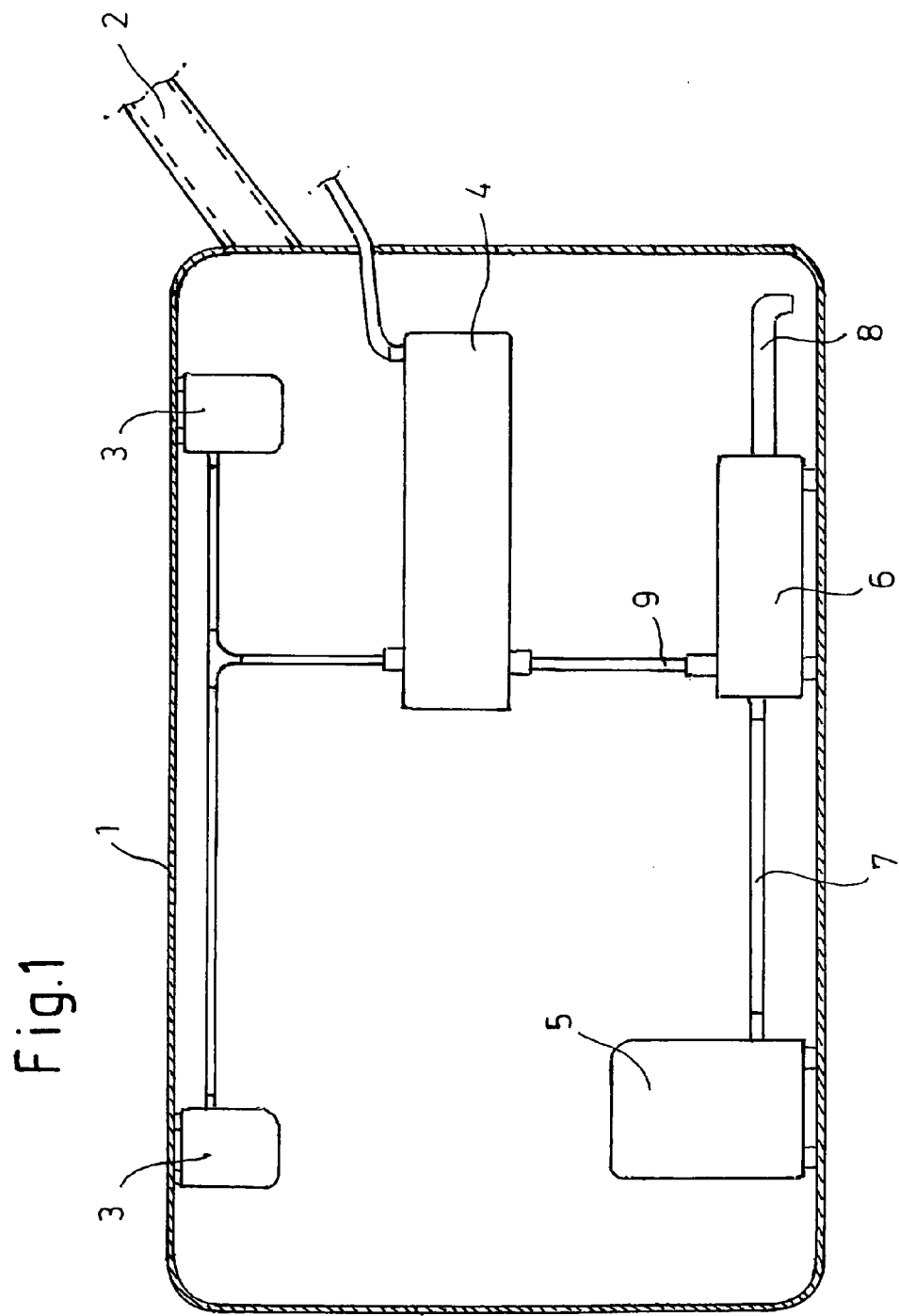

fuel tank, comprising a device (6) for pressure-dependent opening of a suction intake (10).

10 Claims, 2 Drawing Sheets

(58) Field of Classification Search
USPC .......................... 417/151, 182–184, 188, 189
See application file for complete search history.

(56) References Cited

U.S. PATENT DOCUMENTS

| | | |
|---|---|---|
| 6,364,625 B1 | 4/2002 | Sertier |
| 2002/0074059 A1 | 6/2002 | Schaefer et al. |
| 2002/0088439 A1 | 7/2002 | Distelhoff et al. |
| 2003/0118455 A1* | 6/2003 | Vilela ..................... F04F 5/461 417/189 |
| 2005/0051141 A1 | 3/2005 | Rumpf |
| 2005/0155670 A1 | 7/2005 | Aschoff et al. |

FOREIGN PATENT DOCUMENTS

| | | |
|---|---|---|
| EP | 1504943 A2 | 2/2005 |
| WO | 2008/148598 A1 | 12/2008 |

\* cited by examiner

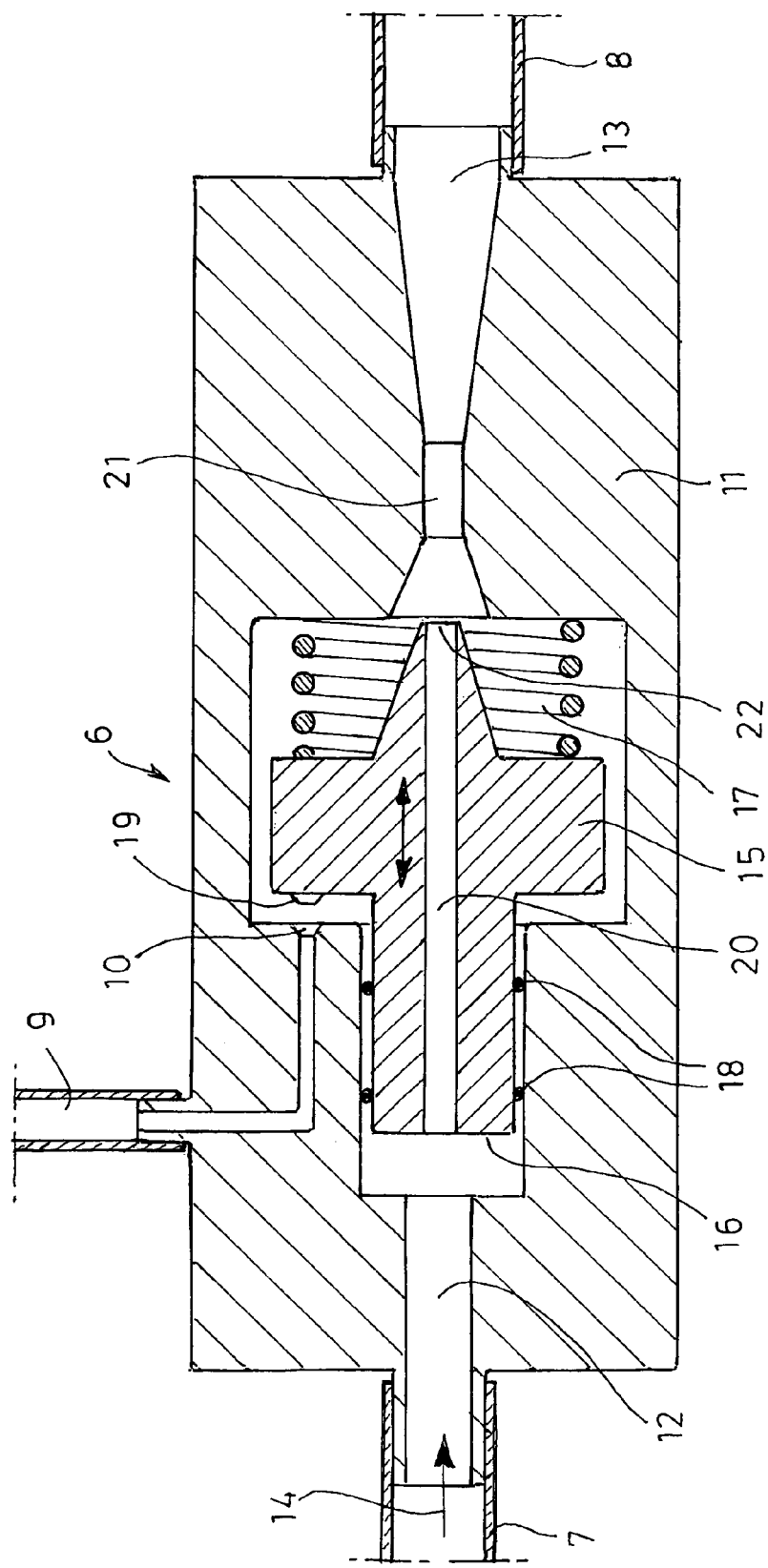

DEVICE FOR PRESSURE-DEPENDENT OPENING OF A SUCTION INTAKE

The invention relates to a device for pressure-dependent opening of a suction intake.

The fuel tanks nowadays used in motor vehicles are generally made of plastic by the injection molding or blow molding method and are disclosed, for example, by DE 100 63 414 A1.

Such fuel tanks comprise a separating device, such as a vapor bubble extraction vessel, for example, for separating the fuel from fuel vapors, the vapor bubble extraction vessel being connected to the surroundings by way of an activated charcoal filter. The activated charcoal filter serves to equalize the pressure of the chamber when refilling the fuel tank or in the event of a temperature change. Located in the line to the activated charcoal filter is a valve, which closes the line in extreme driving situations of the motor vehicle for example, or in the event of flashover, and thereby prevents fuel escaping from the fuel tank.

EP 1 504 943 B1 discloses the active extraction of the liquid contained in the vapor bubble extraction vessel by means of a suction jet pump and its return to the fuel tank.

In order to prevent fuel getting into the vapor bubble extraction vessel directly from the fuel tank, a non-return valve is arranged between the suction jet pump and the vapor bubble extraction vessel.

In a suction jet pump the suction effect is produced by a fluid jet, also called the motive fluid, which through momentum exchange draws in, accelerates and compresses/delivers another fluid, also called the suction fluid. The suction jet pumps generally used in motor vehicles nowadays generate a vacuum of 100 mbar, for example. If an additional non-return valve is situated between the suction jet pump and the vapor bubble extraction vessel, the vacuum generated must serve both to open the non-return valve and to extract the liquid contained in the vapor bubble extraction vessel. One disadvantage to the non-return valves, known in the state of the art, between the suction jet pump and the vapor bubble extraction vessel, which are embodied as so-called "mushroom valves", for example, is that a proportion of the effective vacuum of the suction jet pump is lost due to the opening of the non-return valve. In order to reduce the loss of effective vacuum of the suction jet pump, the closing force of the non-return valve is generally limited, which, however, is detrimental to the leak-tightness of the non-return valve. Moreover, with a low closing force of the non-return valve, any fouling leads more rapidly to leakages.

The object of the invention, therefore, is to provide a device which with the suction jet pump running establishes a fluid connection between the suction jet pump and a separating device, such as a vapor bubble extraction vessel, for example, and which with the suction jet pump switched off tightly closes the fluid connection between the fuel tank and the separating device, in particular one which minimizes a loss of the effective vacuum of the suction jet pump.

According to the invention the object is achieved by a device for pressure-dependent opening of a suction intake, comprising a suction jet pump, comprising a feed line, an outlet line and the suction intake; a valve body, displaceably arranged inside the feed line in the delivery direction of the suction jet pump and having an effective area exposed to the feed pressure of the suction jet pump; and a spring element, arranged between the feed line and the valve body, for applying a force in opposition to the feed pressure inside the feed line; wherein the effective area of the valve body, and the spring element are designed so that the valve body closes the suction intake so that it is fluid-tight below a predefined pressure inside the feed line and opens said intake when the predefined pressure inside the feed line is exceeded.

The device according to the invention has the advantage that it opens and closes the suction intake between the suction jet pump and the separating device as a function of the pressure in the feed line of the suction jet pump. The pressure prevailing in the feed line when the suction jet pump is in operation therefore actuates a valve, closed in the inoperative state, thereby opening the suction intake. If the pressure in the feed line of the suction jet pump falls below a predefined pressure, the valve is returned to the inoperative state and the suction intake is closed so that it is fluid-tight. The opening force of the device according to the invention may be freely selected through the size of the effective area of the valve body in connection with the feed pressure of the suction jet pump. The closing forces applied by the spring element must be designed according to the desired sealing forces, taking into account the feed pressure of the suction jet pump and the effective area of the valve body, so that the device according to the invention opens the feed line when a predefined pressure is reached inside the feed line.

A particular distinguishing feature of the device according to the invention is a very low pressure loss between the suction jet pump and the separating device, thus increasing the efficiency of the suction jet pump.

According to a variant of the invention, at least one first sealing element is arranged between the feed line and the valve body. The first sealing element serves to prevent the fluid transported in the feed line escaping through the joint between the feed line and the valve body displaceably arranged therein.

According to a further variant of the invention, a second sealing element is arranged on the valve body in the area of the suction intake of the suction jet pump. The second sealing element serves to improve the leak-tightness of the device according to the invention in the area of the suction intake below the predefined pressure inside the feed line.

According to a variant of the invention, the valve body comprises a fluid-transmitting passage, which is arranged in the delivery direction of the suction jet pump and which serves as part of the feed line of the suction jet pump. By means of the passage, therefore, the valve body serves as part of the feed line. This affords the most rectilinear fluid flow possible through the feed line, thereby minimizing the pressure losses due to the device according to the invention.

In a further variant of the invention, the cross section in the area between the feed line and the outlet line has a constriction, formed by two opposing cones, for example, which are united at the point of the smallest diameter. A fluid line connected to the suction intake is arranged in the immediate vicinity of the constriction. If a fluid is delivered through the feed line at a specific feed pressure, the dynamic pressure at the constriction is at a maximum, and the static pressure at a minimum, so that the velocity of the delivered fluid increases. At the same time the pressure falls in the fluid line to the suction intake. The resulting vacuum serves to draw in a fluid through the suction intake.

According to a further variant of the invention, the suction jet pump further comprises a nozzle, arranged at the end of the feed line in the delivery direction of the suction jet pump. For the purposes of the invention, a nozzle is a tubular, technical device which may have the same area over its entire length, or which may widen, taper or have other complex forms. The nozzle serves to convert the pressure prevailing inside the feed line into kinetic energy, thereby further increasing the effective vacuum of the suction jet pump.

According to an especially suitable variant of the invention, the valve body and the nozzle are integrally formed. In particular, the effective area of the valve body, and the spring element are designed so that under the displacement of the valve body usually occurring the nozzle is arranged in the optimum position relative to the outlet line of the suction jet pump, in order to obtain the greatest possible suction effect of the suction jet pump. Since the pressure usually prevailing in the feed line is known, the effective area of the valve body, and the spring element can be designed so that under the displacement of the valve body usually occurring at the pressure usually prevailing in the feed line the nozzle, integrally formed with the valve body, is optimally arranged in relation to the outlet line of the suction jet pump, thereby maximizing the suction effect of the suction jet pump.

The invention further relates to a fuel tank, comprising a device for pressure-dependent opening of a suction intake according to the preceding description.

In a variant of the fuel tank, the feed line is connected to a fuel supply pump via a first fuel line, the outlet line is connected to the interior of the fuel tank via a second fuel line and the suction intake is connected to a separating device, in particular to a vapor bubble extraction vessel. Here the device according to the invention is designed so that the separating device is drained by the suction jet pump when the fuel supply pump provides a predefined pressure inside the feed line.

Alternatively, the suction intake is connected to the wall of a swirl pot. When the fuel supply pump delivers fuel through the feed line and outlet line of the suction jet pump, fuel is likewise delivered by means of the suction jet pump via the suction intake arranged in the wall of the swirl pot. When the fuel supply pump is switched off, the pressure inside the feed line falls below the predefined pressure and the suction intake in the wall of the swirl pot is closed by the valve body of the device according to the invention. The swirl pot, in which the fuel supply pump is usually arranged, can therefore not run empty when the fuel supply pump is idle.

The invention is explained in more detail below with reference to an exemplary embodiment represented in the figures, of which:

FIG. 1 shows a sectional view of a fuel tank with device for pressure-dependent opening of a suction intake arranged therein, and FIG. 2 shows a detailed view of the device for pressure-dependent opening of a suction intake.

FIG. 1 schematically shows a sectional view through a fuel tank 1 having a chamber for receiving fuel. The fuel tank 1 comprises a filler neck 2 for filling the fuel tank 1.

Venting valves 3, which serve for regulating the pressure inside the fuel tank 1, are arranged at what is, in the installed position, the upper end of the fuel tank 1.

The vapor bubble extraction vessel 4 serves for separating fuel from fuel vapors and is generally connected to the surroundings via an activated charcoal filter. The fuel accumulating in the vapor bubble extraction vessel 4 is usually extracted actively, for example by means of a suction jet pump 11. It must be ensured here, however, that when the suction jet pump 11 is switched off no fuel from the fuel tank 1 gets into the vapor bubble extraction vessel 4.

For this purpose, according to the invention a device 6 for pressure-dependent opening of the suction intake 10 is arranged inside the fuel tank 1.

The device 6 for pressure-dependent opening of the suction intake 10 comprises a feed line 12, which is connected to a fuel supply pump 5 via a first fuel line 7, an outlet line 13, which is connected to the interior of the fuel tank via a second fuel line 8, and the suction intake 10, which is connected to the vapor bubble extraction vessel 4 via a third fuel line 9. The second fuel line 8 is also referred to as a combined line and is connected to the interior of the fuel tank 1, in order to return the fuel extracted from the vapor bubble extraction vessel 4 into the fuel tank 1.

The first fuel line 7 is suitably not just connected to the fuel pump 5 but is embodied as a branch of a main supply line (not shown), in order to divert a proportion of the fuel delivered by the fuel pump 5 and to carry it through the device 6 according to the invention for pressure-dependent opening of a suction intake 10.

FIG. 2 shows a detailed view of the device 6 according to the invention for pressure-dependent opening of a suction intake 10, comprising a suction jet pump 11, comprising the feed line 12, the outlet line 13 and the suction intake 10; a valve body 15, displaceably arranged inside the feed line 12 in the delivery direction 14 of the suction jet pump 11 and having an effective area 16 exposed to the feed pressure of the suction jet pump 11; and a spring element 17, arranged between the feed line 12 and the valve body 15, for applying a force in opposition to the feed pressure inside the feed line 12. The effective area 16 of the valve body 15, and the spring element 17 are designed so that the valve body 15 closes the suction intake 10 so that it is fluid-tight below a predefined pressure inside the feed line 12 and opens said intake when the predefined pressure inside the feed line 12 is exceeded. The movement of the valve body 15 inside the feed line 12 is therefore controlled by the feed pressure inside the feed line 12, the feed pressure inside the feed line 12 being applied by the fuel supply pump 5.

According to FIG. 2 two first sealing elements 18, which are embodied in the form of an O-ring, are arranged between the feed line 12 and the valve body 15. The first sealing elements 18 seal off the connection between the feed line 12 and the valve body 15 displaceably arranged therein.

In the area of the suction intake 10 of the suction jet pump 11 the valve body 15 comprises a second sealing element 19, which improves the leak-tightness between the valve body 15 and the suction intake 10 when the device 6 according to the invention for pressure-dependent opening of a suction intake 10 is in the closed state.

The valve body 15 additionally comprises a fluid-transmitting passage 20, which is arranged in the delivery direction 14 of the suction jet pump 11 and which serves as part of the feed line 12 of the suction jet pump 11. This affords the most rectilinear flow of fuel possible from the fuel supply pump 5 via the feed line 12 and the passage 20 in the valve body 15 to the outlet line 13.

The suction jet pump 11 further comprises a constriction 21 of the cross section in the area between the feed line 12 and the outlet line 13, which is formed, for example, by two opposing cones, which are united at the point of the smallest diameter. Such a configuration is also referred to as a Venturi nozzle and is one possible way of obtaining the suction effect of a suction jet pump 11.

The suction jet pump 11 according to FIG. 2 further comprises a nozzle 22, which is arranged at the end of the feed line 12 in the delivery direction 14 of the suction jet pump 11 and which is continued through the passage 20. Since the nozzle 22 converts the pressure inside the feed line 12 into kinetic energy, the suction effect of the suction jet pump 11 is further improved by means of the nozzle 22.

As can be seen from FIG. 2, the valve body 15 and the nozzle 22 are integrally formed.

The effective area 16 of the valve body 15, and the spring element 17 are designed so that under the displacement of the valve body 15 usually occurring the nozzle 22 is arranged in the optimum position relative to the outlet line 13 of the suction jet pump 11, in order to obtain the greatest possible suction effect. The displacement of the valve body 15 usually occurring can be determined from the pressure prevailing in the feed line 12, together with the effective area 16 of the valve body 15 and the spring force of the spring element 17. The pressure inside the feed line 12 is applied by the fuel supply pump 5 and is usually stable.

LIST OF REFERENCE NUMERALS 1 fuel tank
2 filler neck
3 venting valve
4 vapor bubble extraction vessel
5 fuel supply pump
6 device for pressure-dependent opening of a suction intake
7 first fuel line
8 second fuel line/combined line
9 third fuel line
10 suction intake
11 suction jet pump
12 feed line
13 outlet line
14 delivery direction
15 valve body
16 effective area
17 spring element
18 first sealing element
19 second sealing element
20 passage
21 constriction
22 nozzle

The invention claimed is:

1. A device for pressure-dependent opening of a suction intake, comprising:
    a suction jet pump, comprising a feed line, an outlet line and the suction intake;
    a valve body, displaceably arranged inside the feed line in a delivery direction of the suction jet pump and having an effective area exposed to a feed pressure inside the feed line;
    a spring element, arranged between the feed line and the valve body, configured to apply a force in opposition to the feed pressure inside the feed line;
    wherein the effective area of the valve body, and the spring element are operable such that, when the feed pressure inside the feed line is below a predefined feed pressure, the spring element is configured to apply the force on the valve body to close the suction intake such that the suction intake is fluid-tight, and, when the feed pressure inside the feed line exceeds the predefined feed pressure, the feed pressure is configured to apply a force on the valve body to open the suction intake against the force of the spring element and having a sealing element to engage said suction intake; and
    wherein the suction intake is configured to suction a fluid from an intake separate from said feed line wherein said fluid from said suction intake is delivered to said outlet line of said device and wherein said sealing element moves along the delivery direction to open and close said suction intake.

2. The device as claimed in claim 1, wherein at least one first sealing element is arranged between the feed line and the valve body.

3. The device as claimed in claim 1, wherein said sealing element is arranged on the valve body in the area of the suction intake of the suction jet pump.

4. The device as claimed in claim 1, wherein the valve body comprises a fluid-transmitting passage, which is arranged in the delivery direction of the suction jet pump and which serves as part of the feed line of the suction jet pump.

5. The device as claimed in claim 1, wherein the cross section in the area between the feed line and the outlet line has a constriction, formed by two opposing cones, which are united at a point of the smallest diameter.

6. The device as claimed in claim 1, wherein the suction jet pump further comprises a nozzle, arranged at the end of the feed line in the delivery direction of the suction jet pump.

7. The device as claimed in claim 6, wherein the valve body and the nozzle are integrally formed.

8. The device as claimed in claim 7, wherein the effective area of the valve body, and the spring element are designed so that, under the displacement of the valve body, the nozzle is arranged in a position relative to the outlet line of the suction jet pump which obtains a maximum suction effect.

9. A fuel tank comprising:
    a device for pressure-dependent opening of a suction intake, the device including
        a suction jet pump, comprising a feed line, an outlet line and the suction intake;
        a valve body, displaceably arranged inside the feed line in a delivery direction of the suction jet pump and having an effective area exposed to a feed pressure inside the feed line;
        a spring element, arranged between the feed line and the valve body, configured to apply a force in opposition to the feed pressure inside the feed line;
        wherein the effective area of the valve body, and the spring element are operable such that, when the feed pressure inside the feed line is below a predefined feed pressure, the spring element is configured to apply the force on the valve body to close the suction intake such that the suction intake is fluid-tight, and, when the feed pressure inside the feed line exceeds the predefined feed pressure, the feed pressure is configured to apply a force on the valve body to open the suction intake against the force of the spring element and having a sealing element to engage said suction intake; and
        wherein the suction intake is configured to suction a fluid from an intake separate from said feed line wherein said fluid from said suction intake is delivered to said outlet line of said device and wherein said sealing element moves along the delivery direction to open and close said suction intake.

10. The fuel tank as claimed in claim 9, wherein the feed line is connected to a fuel supply pump via a first fuel line, the outlet line is connected to an interior of the fuel tank via a second fuel line, and the suction intake is connected to a separating device or to a swirl pot via a third fuel line.

* * * * *